Patented Aug. 9, 1932

1,871,037

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Application filed September 11, 1930. Serial No. 481,353.

This invention relates to processes for controlling the vulcanization of rubber and similar vulcanizable materials and products obtained thereby. It is more particularly directed to processes of checking or retarding the vulcanization of rubber containing vulcanizing and accelerating ingredients and thereafter when desired causing vulcanization of the rubber.

A number of methods have been proposed for controlling or inhibiting the activity of accelerators in rubber containing vulcanizing ingredients prior to the final step of vulcanizing. Some of these require the building up of alternate plies of two different rubber stocks containing complementary vulcanizing ingredients. Such methods are not readily applicable in the production of many kinds of rubber goods. In others where a retarder of vulcanization is used, the retarder employed entirely prevents vulcanization of rubber portions containing it. In still other methods the functioning of the accelerator is actually retarded both during the mixing and forming operations and also during the vulcanization process itself, particularly where the retarder employed functions at higher as well as lower temperatures. In such a process there results a slower rate of cure than is normally desired. These and other disadvantages are overcome by the process described below.

An object of this invention is to provide a process of curbing or checking the vulcanization of rubber containing the necessary vulcanizing and compounding ingredients including an accelerator of vulcanization, particularly an accelerator of the "ultra" or "semi-ultra" type by treating the same with a vulcanization retarder and then when desired destroying the functional activity of the retarder so that complete vulcanization may be effected at the same time or afterwards depending on the manner and extent of heat treatment of the rubber and the extent to which the activity of the retarder is destroyed. Another object is to provide a process whereby a rubber stock may be safely handled at high temperatures, shaped into any desired form, or stored, without danger of scorching or setting up, and whereby shaped rubber may when desired be treated in a manner to effectuate a rapid cure and provide a vulcanizate having high tensile strength and other desirable properties. Further objects will be apparent from the following detailed description.

Accordingly the invention comprises incorporating in a mass of rubber compounding ingredients including a vulcanizing agent and an accelerator of vulcanization together with an acidic substance or substances adapted to function as a vulcanization retarder, shaping the rubber stock into the desired form, and then at will treating the stock with ammonia and vulcanizing the rubber. Among such retarders are acids,—organic and inorganic,—acid salts of alkali-metals and strong poly-basic acids, water-soluble heavy metal salts of strong acids, acid anhydrides, acid chlorides, and the like. More specifically, sulfuric, phosphoric, hydrochloric, o-chlorobenzoic, o-nitro-benzoic, salicylic, acetic, mono-chloracetic, dichloracetic, trichloracetic, sulfanilic, beta-naphthalene sulfonic, and picric acids, di-nitro-phenol, beta-naphthalene sulfone chloride, p-toluene sulfone chloride, phthalic anhydride, acetic anhydride, sodium acid sulfate, mono-sodium phosphate, zinc chloride, zinc nitrate, mercuric chloride, stannous chloride, calcium chloride, magnesium chloride, aluminum chloride, ammonium chloride, ammonium nitrate and the like. The amount of retarder used may be varied, so as to attain any degree of safety desired in the rubber compound, for example sufficient retarder may be used so that the rubber is unvulcanizable by the agency of heat alone.

The retarder may be mixed with the rubber composition before, during or after the time that the other ingredients are added. Where reclaimed rubber is added to the mix it may be incorporated with the reclaim before adding to the mix. In order to obtain good dispersion of the retarder throughout the mass of the rubber it is preferable as in the case of solid crystalline materials to dissolve the material in a small amount of a solvent for instance water before incorporating it with the rubber. The solvent quickly evaporates during the subsequent milling leaving the retarder dispersed throughout the mass of rubber in finely divided form. After the rubber mix has been prepared it may be stored in any desired form or subjected to the usual processing such as calendering, extrusion and manipulation into the desired form, prior to vulcanization proper.

The following examples in which the parts are by weight are illustrative of the invention but are to be understood as not limiting thereof:

*Example 1.*—A stock is made up having the following composition:

|  | Parts |
|---|---|
| Rubber (smoked sheets) | 100 |
| Zinc oxide | 6 |
| Blanc fixe | 30 |
| Whiting | 25 |
| Red iron oxide | 3.5 |
| Paraffin wax | 1.0 |
| Zinc chloride (in water) | 0.1 |
| Sulphur | 2.25 |
| Stearic acid | 1.0 |
| Mercaptobenzothiazole | 0.9 |
| Tetramethyl thiuram monosulfide | 0.1 |
| Acetone-diphenylamine reaction product | 0.25 |

This stock is extruded from a tubing machine, without scorching, at a rate two and one-half times faster than that at which a similar stock, from which the zinc chloride was omitted, can be extruded without scorching. The extruded tube is cut into suitable lengths, the lengths fitted with valve bases and valves, and shaped on a forming ring into the approximate shape and size of automobile inner tubes,—all in known manner. Then, the tubes are inflated with ammonia. Some of the ammonia-filled tubes are immediately placed in molds and cured, in known manner, for various lengths of time at a temperature corresponding to steam pressure of 60 lbs. per sq. in. The remaining tubes are allowed to stand for two hours in contact with the ammonia contained therein, and are thereafter cured as above described. The results of physical tests are as follows:

| Elapsed time between inflation and curing | 0 | | 2 hrs. | |
|---|---|---|---|---|
| Time of cure | T | E | T | E |
| 2' | | | 3852 | 585 |
| 3' | 2980 | 580 | 3883 | 570 |
| 4' | 2493 | 550 | 3664 | 555 |
| 5' | 2617 | 560 | 3225 | 520 |
| 6' | 3160 | 550 | 3476 | 580 |

(T=Tensile strength, lbs. per sq. in.)
(E=Elongation at break.)

As a comparison, another tube is inflated only with air, and cured for 6 minutes, after which the tensile strength was 2900, and the elongation at break was 620%.

The results indicate that a very fast cure and high tensile strength may be obtained by treating the stock containing zinc chloride with ammonia, and vulcanizing particularly when the treated stock is allowed to stand for a substantial period of time after inflation with ammonia.

*Example 2.*—A similar process is carried out, using a stock similar to that of Example 1, but containing 0.75 part of mercaptobenzothiazole as the accelerator, and 0.1 part $ZnCl_2$. Tubes formed from this stock are inflated with ammonia and allowed to stand for various periods of time, and are then cured in molds, as above. The results of physical tests are as follows:

| Elapsed time between inflation and curing | 0 | | ½ hr. | | 1 hr. | | 2 hrs. | |
|---|---|---|---|---|---|---|---|---|
| Time of cure at 60# | T | E | T | E | T | E | T | E |
| 3' | 3223 | 625 | 3600 | 620 | 3046 | 600 | 3575 | 635 |
| 4' | 2088 | 590 | 3510 | 640 | 3682 | 647 | 3650 | 617 |
| 5' | 2745 | 595 | 3205 | 583 | 3702 | 615 | 3405 | 580 |

*Example 3.*—A base stock is prepared according to the following formula:

|  | Parts |
|---|---|
| Pale crepe rubber | 69 |
| Whiting | 17 |
| Zinc oxide | 7 |
| "Soft" carbon | 5 |
| Paraffin-base wax (high melting point) | 1 |
| Sulfur | 1 |
|  | 100 |

Into a portion (A) of this base stock is incorporated 0.07% of tetramethyl thiuram monosulfide, and into another portion (B) are incorporated 0.15% of tetramethyl thiuram monosulfide and 0.4% of zinc chloride, calculated on the weight of base stock taken. Portions "A" and "B" are sheeted out to a thickness of approximately .040", and are then cured in a mixture of air and ammonia according to the following procedure:—The sheets are placed in a heater, then ammonia is admitted until the gauge pressure inside the heater is 6 lbs. per sq. in. The flow of ammonia is then shut off and air under pressure admitted until the total gauge pressure is 30 lbs. The temperature of the heater is then raised according to the following schedule:

Cure #1.—45 minutes gradual rise from room temperature to 240° F.

Cure #2.—Cure #1 plus 20 minutes during which the temperature is held at 240° F.

Cure #3.—Cure #1 plus 40 minutes at 240° F.

The tensile strengths of the cured sheets (in lbs. per sq. in.) are found to be as follows:

| Cure | Stock "A" | Stock "B" |
|---|---|---|
| #1 | 2795 | 3220 |
| #2 | 2837 | 3403 |
| #3 | 2787 | 2803 |

Unvulcanized portions of "A" and "B" are also placed in a mold and heated for 120 minutes at a temperature corresponding to a steam pressure of 5 lbs. per sq. in., a temperature somewhat higher than the usual milling and calendering temperatures. "A" is then found to be substantially stiffer than "B," that is, better cured.

From the results of these two series of cures on "A" and "B" it is evident that "B" cures at a slower rate than "A" when the stocks have not been treated with ammonia, even though "B" contains more than twice as much accelerator as "A," and that in the presence of ammonia "B" cures at a faster rate than "A." Thus there are obtained the advantages to be derived by the use of relatively high amounts of accelerator, together with freedom from scorching during manipulation or storage of the rubber before it is desired to effect vulcanization.

*Example 4.*—To other portions of the base stock described in Example 3 are added a retarder and/or an accelerator as follows:

Stock "C"=Base stock+0.1% of tetramethyl thiuram-disulphide.

Stock "D"=Base stock Z+0.2% of tetramethyl thiuram-disulphide+ 0.6% of zinc chloride.

Stocks "C" and "D" were then sheeted out and cured in the presence of a mixture of air and ammonia, as described in Example 3, (the cures being numbered the same as in Example 3.) The stocks were then tested for tensile strength.

| Cure | Stock "C" | | Stock "D" | |
|---|---|---|---|---|
| | T | E | T | E |
| 2 | 2910 | 610 | 2650 | 630 |
| 3 | 2927 | 630 | 2983 | 590 |

(T=Tensile strength in lbs. per sq. in.)
(E=Elongation at break)

Stock "C" scorches readily; but Stock "D," containing a doubled amount of accelerator, can be handled quite safely due to the retarding effect of the zinc chloride contained therein.

*Example 5.*—To other portions of the base stock described above are added a retarder and/or an accelerator as follows:

Stock "E"=Base stock+0.15% of tetramethyl thiuram disulfide.

Stock "F"=Base stock+0.15% of tetramethyl thiuram disulfide+ 0.75% of phthalic anhydride.

Stocks "E" and "F" are cured in the presence of air and ammonia, and tested, in the same manner as in Example 3.

| Cure | Stock "E" | | Stock "F" | |
|---|---|---|---|---|
| | T | E | T | E |
| 1 | 3045 | 610 | 3055 | 620 |
| 2 | 2870 | 580 | 3080 | 590 |
| 3 | 2677 | 590 | 2962 | 580 |

Stock "E" is very liable to scorching, while Stock "F" is free from danger of scorching. The retarding effect of phthalic anhydride is thus similar to that of zinc chloride, and is similarly nullified when the stock containing it is treated with ammonia.

*Example 6.*—To other portions of the base stock described above are added a retarder and/or an accelerator as follows:

Stock "G"=Base stock+0.3% of mercapto-benzothiazole.

Stock "H"=Base stock+0.3% of mercapto-benzothiazole+0.1% of zinc chloride.

Stocks "G" and "H" are sheeted out and subjected to cures 2 and 3 as described above, and also to an additional similar cure (#4) in which the temperature is held for 60 min. at 240° F. Physical tests are as follows:

| Cure | Stock "G" | | Stock "H" | |
|---|---|---|---|---|
| | T | E | T | E |
| 2 | 3440 | 650 | 3678 | 630 |
| 3 | 2985 | 640 | 3025 | 590 |
| 4 | 2820 | 660 | 3200 | 600 |

Before treatment with ammonia stock "G" is comparatively safe to handle, but the safety is greatly increased by the addition of a retarder, such as the zinc chloride of the present example.

*Example 7.*—To other portions of the base stock described above are added a retarder and/or an accelerator as follows:

Stock "I"=Base stock+1% of heptaldehydeaniline condensation product diluted with spindle oil.

Stock "J"=Base stock+1% of the accelerator used in stock "I"+0.5% of zinc chloride.

Stocks "I" and "J" are sheeted out, and subjected to a series of cures in a mixture of air and ammonia, the time and temperature being as follows:

Cure #5.—35 min. rise from room temperature to 240° F., and 60 min. rise from 240° F. to 265° F.

Cure #7.—Same rise as Cure #5, the temperature then being held for 40 min. at 265° F.

Air and ammonia are admitted to the heater in the same manner as in the carrying out Cures 1 to 4 described above.

Physical tests on vulcanized Stocks "I" and "J" are as follows:

| Cure | Stock "I" T | Stock "J" T |
|---|---|---|
| 5 | 2483 | 3153 |
| 7 | 2478 | 2597 |

In a mold cure Stock "J" cured at a slower rate than Stock "I", showing that the zinc chloride functions as a retarder of vulcanization in the presence of an aldehyde-amine accelerator, and that the retarding effect may be nullified at will by treating the stock containing the accelerator and the retarder with ammonia. The use of a retarder in such as Stock "I" is unnecessary under normal conditions, but is advantageous, in combination with the ammonia cure, when it is desired to manipulate the stock at higher temperatures prior to vulcanization.

*Example 8.*—A second base stock is prepared consisting of "latex-sprayed" rubber (containing all of the solids originally present in the latex), and the same compounding ingredients that were used in the base stock described under Example 3, in the same relative proportions.

To portions of this second base stock are added a retarder and/or an accelerator as follows:

Stock "K"=Base stock+0.2% of 2,4-dinitrophenyl dimethyl dithiocarbamate.
Stock "L"=Base stock+0.3% of 2,4-dinitrophenyl dimethyl dithiocarbamate+1.1% of zinc chloride.

Stocks "K" and "L" are sheeted out and subjected to Cures 2 and 3 as described under Example 3. Physical tests are as follows:

| Cure | Stock "K" T | E | Stock "L" T | E |
|---|---|---|---|---|
| 2 | 3217 | 620 | 2993 | 590 |
| 3 | 2880 | 620 | 2920 | 600 |

Stock "K" scorches very readily, and great care must be taken in handling this stock due to the ability of the accelerator to be activated at relatively moderate or low temperatures by the naturally-occurring basic constituents present in the sprayed rubber. The fast-curing properties of sprayed rubbers are well known. By the addition of a retarder, as in Stock "L", the tendency to scorch may be decreased or entirely eliminated, depending on the amount of retarder employed, and a fast cure may be effected when desired by treating the compounded stock with ammonia and heating as required. In the examples given, Stock "L" cures very slowly in a mold at 5 lbs. steam pressure, but cures rapidly in the presence of ammonia.

*Example 9.*—A series of stocks are prepared according to the following formulæ:

|  | M | N | O | P |
|---|---|---|---|---|
| Smoked sheets | 39 | | | |
| Latex-sprayed rubber | | 39 | 39 | 39 |
| Zinc oxide | 4 | 4 | 4 | 4 |
| Sulphur | 1 | 1 | 1 | 1 |
| Lampblack | 2.9 | 2.9 | 2.9 | 2.9 |
| Whiting | 42 | 42 | 42 | 42 |
| Paraffin oil | 3 | 3 | 3 | 3 |
| Heptaldehyde-aniline condensation-product | 0.25 | 0.25 | 0.25 | 0.25 |
| Zinc chloride | | | 0.56 | 0.04 |

These four stocks are sheeted out to a thickness of approximately .040″, and are then subjected to a cure in the presence of air and ammonia, according to the procedure used in Cure #5 of Example 7, and also to a similar cure in which the temperature was held for 30 min. at 265° F., the latter to be designated as Cure #6. Physical tests resulted as follows:

| Cure | Cured in air-ammonia mixture | | | | | | | |
|---|---|---|---|---|---|---|---|---|
| | M | | N | | O | | P | |
| | T | E | T | E | T | E | T | E |
| 5 | 1812 | 610 | 1778 | 600 | 1663 | 530 | 2182 | 520 |
| 6 | 1748 | 610 | 1800 | 520 | 1588 | 620 | 2200 | 610 |

It will be seen that all of the stocks cured to about the same extent in the presence of ammonia.

Portions of Stocks "M", "N", "O" and "P" are also subjected to an ordinary air cure under the same conditions of time and temperature that are used in Cure #5, no ammonia being present. Examination of the stocks by hand shows the following states of cure:

Stock "M"—Practically uncured.
Stock "N"—Fairly well-cured.
Stock "O"—Slightly cured.
Stock "P"—Practically uncured.

Comparison of the cures made in air and ammonia with the cures made in air alone shows that in the presence of an organic accelerator, a fast-curing rubber, such as latex-sprayed rubber, may be made as safe to handle at higher temperatures as smoked sheets, by the addition of a suitable amount of retarder. A fast cure may then be effected by vulcanizing in the presence of ammonia.

The non-scorching properties of Stock "P" are also shown by heating a portion of the stock in a mold for 20 min. at 30 lbs. steam pressure. The stock remains uncured during such heating, whereas Stock "N", when heated under the same conditions, is found to be well-cured, having a tensile strength of 1904 lbs. per sq. in.

*Example 10.*—In place of incorporating the acidic material with solid rubber on the mill, it may be added to latex which is subsequently spray-dried to produce solid rubber containing the acidic material. For example, a latex-sprayed rubber is prepared from latex to which had been added 1% of ammonium phosphate, calculated on the rubber content of the latex. Under the conditions of the spray-drying, some ammonia is liberated, leaving in the rubber a mixture of the two acid phosphates and some free phosphoric acid. The amount of acid materials in the sprayed rubber is such that the rate of cure when the rubber is compound with 10% of sulfur and heated at 40 pounds steam pressure is less than the rate of cure of pale crepe rubber similarly compounded and heated.

The above described sprayed rubber containing phosphoric acid and acid salts thereof is employed in preparing the following mix:

| | |
|---|---|
| Spray-dried rubber | 100 |
| Zinc oxide | 10 |
| Sulfur | 3 |
| 2,4-dinitrophenyl dimethyl dithiocarbamate | 0.25 |

This stock is sheeted out to a thickness of .030", placed in a vulcanizer, and cured in a mixture of air and ammonia as follows: ammonia is introduced into the heater until a gauge pressure of 3 pounds per sq. in. is reached. The temperature inside the heater is then raised to 220° F. during 15 minutes and is then held at 220° F. for 135 minutes. The stock is then found to be well cured, having a tensile strength of 2725 pounds per sq. in. A similar stock prepared from spray-dried rubber containing no added acid and cured in a similar manner is found to have a tensile strength of 2815 pounds per sq. in.

*Example 11.*—A stock having the following formula is mixed and sheeted out to a thickness of .030 inch:

| | |
|---|---|
| Pale crepe rubber | 100 |
| Zinc oxide | 10 |
| Sulfur | 3 |
| 2,4-dinitrophenyl dimethyl dithiocarbamate | 1 |
| Monochloracetic acid | 0.4 |

A sample of the sheeted stock is suspended in a closed vessel equipped with inlet and outlet openings. The air is swept out of the vessel by means of a current of ammonia supplied at substantially atmospheric pressure. Then, while a slow current of ammonia through the vessel is maintained, heat is applied and the temperature of the vessel raised to 130° C. during 10 minutes and is then held at 130° C. for 35 minutes. The rubber is then removed and is found to be well cured.

Another sample of the uncured stock is heated in air alone under the same conditions of time and temperature, and is then found to have remained uncured.

*Example 12.*—A shoe stock having the following formula is mixed and sheeted out to a thickness of .040 inch:

| | |
|---|---|
| Pale crepe rubber | 32.5 |
| Fine para rubber | 10 |
| Glue | 2.5 |
| Sulfur | 0.81 |
| Lampblack | 25 |
| Gas black | 3 |
| Zinc oxide | 4 |
| Barytes | 22 |
| 2,4-dinitrophenyl dimethyl dithiocarbamate | 0.5 |
| Monochloracetic acid | 0.1 |

The sheeted rubber is then heated in gaseous ammonia for 30 minutes at a temperature of 140° C. The rubber is then found to be well cured.

The process is of particular advantage when applied to rubber containing organic accelerators of the "ultra" and "semi-ultra" types, which have relatively low critical temperatures and tend to scorch or "set up" prematurely. Among such accelerators are the thiuram disulfides, such as tetramethyl thiuram disulphide; thiuram monosulfides, such as tetramethyl thiuram monosulfide; and mercapto thiazols, such as mercapto benzothiazole. It is also advantageous with accelerators having somewhat higher critical temperatures, which are usually considered safe to handle, but which tend to scorch during such high-temperature operations as extrusion from tubing machines. Among such accelerators are dithiocarbamic esters, such as 2,4 dinitrophenyl dimethyl dithiocarbamate and benzal-bis (dimethyl dithiocarbamate), and aldehyde-amines such as the condensation product of butyraldehyde and aniline. It is also advantageous when it is desired to employ unusually large amounts of accelerator; as the danger of scorching or setting up is eliminated.

Where using ammonia as the activating agent all the organic accelerators within the scope of this invention are of such character that they are compatible with ammonia, that is, ammonia will cooperate with or allow activation of the same during vulcanization so as to give complete vulcanization of the rubber. Accelerators excluded from the scope of this invention are those which are inactivated by ammonia, such as "oxy-n-butyl thiocarbonic acid di-sulfide".

The ammonia treatment may be carried out either prior to or during the vulcanizing step, or vulcanization may be initiated and carried to completion at any time during the ammonia treatment. Elevated temperatures and pressures of ammonia may be employed if desired.

The ammonia may be introduced from a surrounding medium such as air or water.

Besides nullifying the vulcanization-retarding action of the acidic retarder the ammonia quickens the action of the accelerator and usually increases the tensile strength of the final product.

By this invention by the use of acidic material in suitable proportions as required, and ammonia, any rubber or rubber stock may have its vulcanization safely and desirably controlled. The rubber may also be in the form of a rubber cement. The materials may be introduced into the rubber by mixing, milling, painting, dipping or blending in cement form etc.

In addition to the advantages herein described, the process of the invention has been found to give a vulcanized rubber article having a substantially hard, dry, non-oxidized surface substantially free from marring.

The process of the invention may be employed in the production of vulcanized rubber goods generally, and is particularly adapted for the production of footwear, gloves, inner tubes, tires etc. Various modifications of the process make it adaptable to the production of a wide variety of rubber goods.

The term "rubber" is to be construed broadly as including compounded or uncompounded rubber, rubber in the form of or derived from naturally occurring rubber dispersions or from artificially prepared rubber dispersions and whether or not such dispersions contain additional ingredients.

Although various compounding and accelerating ingredients are disclosed herein, other of such ingredients as well as anti-agers may be employed in conjunction with the vulcanization-retarders and vulcanization-activators of this invention.

This case is a continuation-in-part of applications Serial Nos. 258,670 and 258,680, filed March 2, 1928.

Having thus described my invention what I claim and desire to protect by Letters Patent is:

1. A process of controlling the vulcanization of rubber which comprises incorporating with rubber compounding ingredients including a sulphur, an organic accelerator compatible with ammonia, and an acidic vulcanization retarder and subjecting the rubber stock at a vulcanizing temperature to an atmosphere containing ammonia.

2. A process of controlling the vulcanization of rubber which comprises incorporating with rubber compounding ingredients including sulphur, an organic accelerator compatible with ammonia and an acidic vulcanization retarder and subjecting the rubber stock to a mixture of air and ammonia at an elevated temperature and pressure.

3. A process of controlling the vulcanization of rubber which comprises preparing a rubber composition containing vulcanizing and accelerating ingredients compatible with ammonia and an acidic substance adapted to render the stock substantially unvulcanizable, shaping the stock as desired, at will treating the stock with ammonia whereby to restore to the stock its vulcanizable character and vulcanizing the rubber.

4. A process of controlling the vulcanization of rubber which comprises preparing a rubber composition containing vulcanizing and accelerating ingredients compatible with ammonia and an acidic vulcanization-retarder, shaping the stock as desired, at will treating the stock with ammonia whereby to nullify the vulcanization-retarding influence of the acidic retarder, and vulcanizing the rubber.

5. A process of controlling the vulcanization of rubber which comprises incorporating with rubber compounding ingredients including sulphur, an organic accelerator compatible with ammonia, and zinc chloride, at will diffusing into the stock ammonia whereby to nullify the vulcanization-retarding influence of the zinc chloride and vulcanizing the rubber.

6. A process of controlling the vulcanization of rubber which comprises incorporating with rubber compounding ingredients including sulphur, an organic accelerator compatible with ammonia, and an acidic vulcanization retarder, at will treating the mixture with ammonia and vulcanizing the rubber.

7. A process of controlling the vulcanization of rubber which comprises incorporating with rubber compounding ingredients including sulphur, an organic accelerator compatible with ammonia, and zinc chloride and subjecting the rubber stock at a vulcanizing temperature to an atmosphere containing ammonia.

8. A process of controlling the vulcanization of rubber which comprises incorporating with rubber compounding ingredients including sulphur, an organic accelerator compatible with ammonia and acid ammonium phosphate and subjecting the rubber stock at a vulcanizing temperature to an atmosphere containing ammonia.

9. A process of controlling the vulcanization of rubber which comprises incorporating with rubber compounding ingredients including sulphur, an organic accelerator compatible with ammonia, and monochloracetic acid and subjecting the rubber stock at a vulcanizing temperature to an atmosphere containing ammonia.

10. A process of controlling the vulcanization of rubber which comprises incorporating with rubber compounding ingredients including sulphur, an ultra accelerator compatible with ammonia, and an acidic vulcanization retarder, at will treating the mixture with ammonia whereby to nullify the vulcanization retarding influence of the acidic retarder, and vulcanizing the rubber.

11. A process of controlling the vulcanization of rubber which comprises incorporating with rubber compounding ingredients including sulphur, and ultra accelerator compatible with ammonia, and an acidic vulcanization retarder, at will diffusing into the stock ammonia whereby to nullify the vulcanization-retarding influence of the acidic retarder and vulcanizing the rubber.

12. A process of controlling the vulcanization of rubber which comprises incorporating with rubber compounding ingredients including sulphur, an ultra accelerator compatible with ammonia, and an acidic vulcanization retarder and subjecting the rubber stock at a vulcanizing temperature to an atmosphere containing ammonia.

13. A process of controlling the vulcanization of rubber which comprises incorporating with rubber compounding ingredients including sulphur, an ultra accelerator compatible with ammonia, and an acidic vulcanization retarder and subjecting the rubber stock at a vulcanizing temperature to a mixture of air and ammonia at an elevated temperature and pressure.

14. A process of controlling the vulcanization of rubber which comprises incorporating with rubber compounding ingredients including sulphur, an ultra accelerator compatible with ammonia, and zinc chloride, at will treating the mixture with ammonia-containing material whereby to nullify the vulcanization retarding influence of the zinc chloride and vulcanizing the rubber.

15. A process of controlling the vulcanization of rubber which comprises incorporating with rubber compounding ingredients including sulphur, an ultra accelerator compatible with ammonia, and zinc chloride and subjecting the rubber stock at a vulcanizing temperature to an atmosphere containing ammonia.

16. A process of forming a vulcanized rubber article which comprises preparing a rubber composition containing vulcanizing and accelerating ingredients compatible with ammonia and an acidic substance adapted to retard vulcanization of the stock, shaping the stock into substantially tubular form, subjecting the inner surface of the shaped stock to ammonia whereby to restore to the stock its vulcanizable character and vulcanizing the rubber.

17. A process of controlling the vulcanization of rubber which comprises incorporating with rubber compounding ingredients including sulphur a mercapto benzothiazole, and an acidic vulcanization retarder and subjecting the rubber stock at a vulcanizing temperature to an atmosphere containing ammonia.

18. A process of controlling the vulcanization of rubber which comprises incorporating with rubber compounding ingredients including sulphur a mercapto benzothiazole, and zinc chloride and subjecting the rubber stock at a vulcanizing temperature to an atmosphere containing ammonia.

19. A vulcanized rubber product derived from rubber treated according to the process of claim 2.

20. A vulcanized rubber product derived from rubber treated according to the process of claim 4.

21. A vulcanized rubber product derived from rubber treated according to the process of claim 7.

22. A vulcanized rubber product derived from rubber treated according to the process of claim 8.

23. A vulcanized rubber product derived from rubber treated according to the process of claim 9.

24. A vulcanized rubber product derived from rubber treated according to the process of claim 12.

25. A vulcanized rubber product derived from rubber treated according to the process of claim 15.

26. A vulcanized rubber product derived from rubber treated according to the process of claim 17.

27. A vulcanized rubber product derived from rubber treated according to the process of claim 18.

28. A vulcanized rubber product containing an ammonia derivative of a strongly acidic material, said product being derived from rubber containing sulphur, an organic accelerator compatable with ammonia, and a strongly acidic material adapted to retard the vulcanization.

Signed at Passaic, county of Passaic State of New Jersey, this 6th day of September, 1930.

SIDNEY M. CADWELL.